United States Patent [19]

Ironside et al.

[11] Patent Number: 5,523,561
[45] Date of Patent: Jun. 4, 1996

[54] ENHANCED POSITION SIGNALS IN OPTICAL TORQUE SENSORS

[75] Inventors: John M. Ironside, Birmingham; Andrew J. S. Williams, West Midlands, both of England

[73] Assignee: Lucas Industries Public Limited Company, West Midlands, England

[21] Appl. No.: 289,370

[22] Filed: Aug. 11, 1994

[30] Foreign Application Priority Data

Aug. 13, 1993 [GB] United Kingdom ............... 9316851

[51] Int. Cl.$^6$ ............................................... G01D 5/34
[52] U.S. Cl. .................. 250/231.1; 73/862.192; 250/231.14
[58] Field of Search ............................ 340/671, 672, 340/870.28, 870.29; 73/862.192; 250/231.18, 231.14, 237 G, 231.1; 356/375

[56] References Cited

U.S. PATENT DOCUMENTS

| | | | |
|---|---|---|---|
| 3,234,394 | 2/1966 | Worden | 340/671 |
| 4,067,357 | 2/1977 | Yanagishima | 340/672 |
| 4,152,589 | 5/1979 | Mitchell | 250/237 |
| 4,637,264 | 1/1987 | Takahashi et al. | 250/231.14 |
| 4,683,375 | 7/1987 | Hoshino et al. | 250/231.14 |
| 4,770,265 | 9/1988 | Allen . | |
| 4,806,752 | 2/1989 | Fischer | 250/231.14 |
| 4,965,445 | 10/1990 | Ikeuchi et al. | 250/231.14 |

*Primary Examiner*—Georgia Y. Epps
*Assistant Examiner*—Jacqueline M. Steady
*Attorney, Agent, or Firm*—Christensen, O'Connor, Johnson & Kindness

[57] ABSTRACT

A torque sensor, or relative angular movement sensor, capable of measuring the angular displacement of a component in a power-assisted steering system, comprises an input member coupled to one end of a torsion bar, an output member coupled to another end of the torsion bar, LED light sources, a pair of photodetector units adapted to receive light from the LED light sources, and signal processing means adapted to receive output signals from the photodetector units, the output signals of the photodetector units being dependent upon the light signals which they receive, and wherein the signal processing means is adapted to produce a modified output signal which closely matches and is representative of the angular position of a chosen portion of the torsion bar. The signal processing comprises various stages in which the output signals from the photodetector units are processed to generate possible estimates of the instantaneous position of the chosen portion of the torsion bar and the best estimate is calculated and processed to provide a complete position estimate representing the angular position of the chosen portion relative to an arbitrarily chosen zero position.

21 Claims, 6 Drawing Sheets

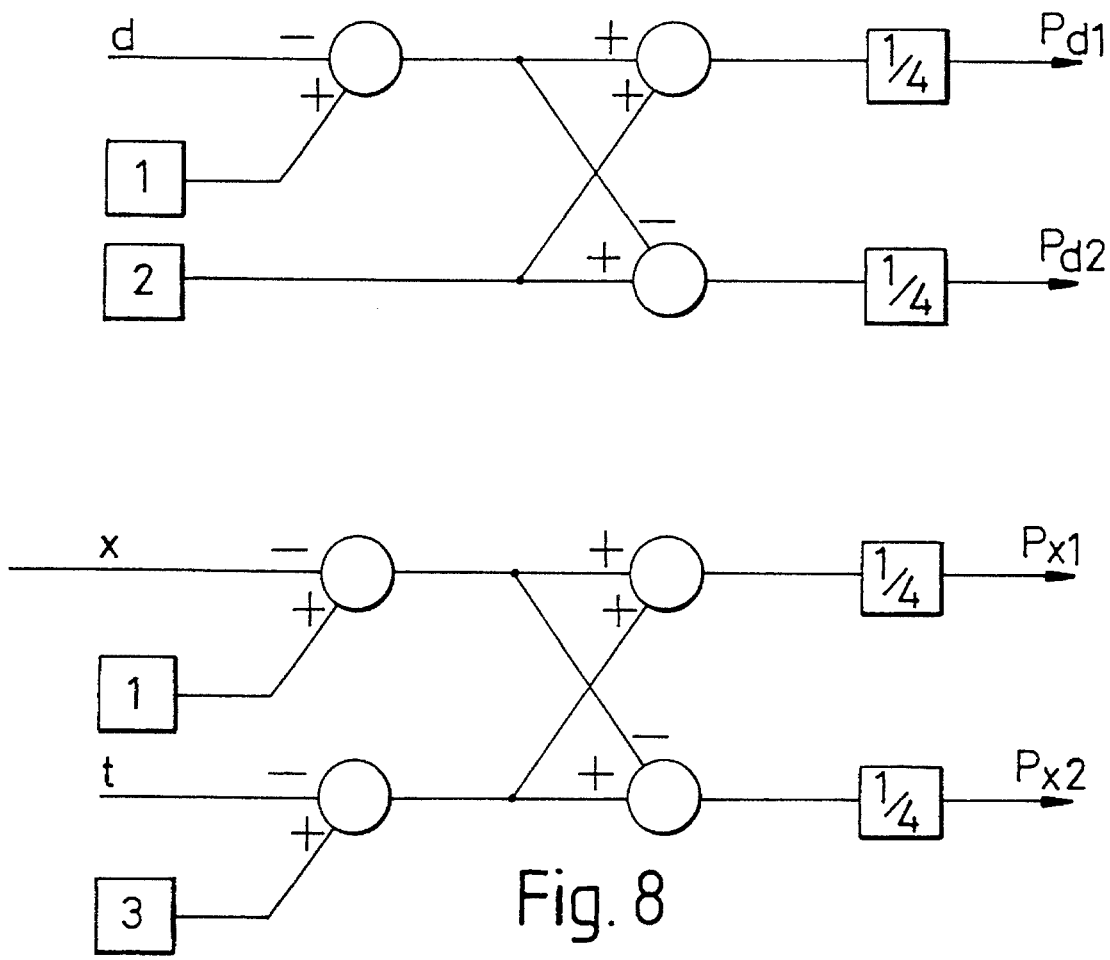
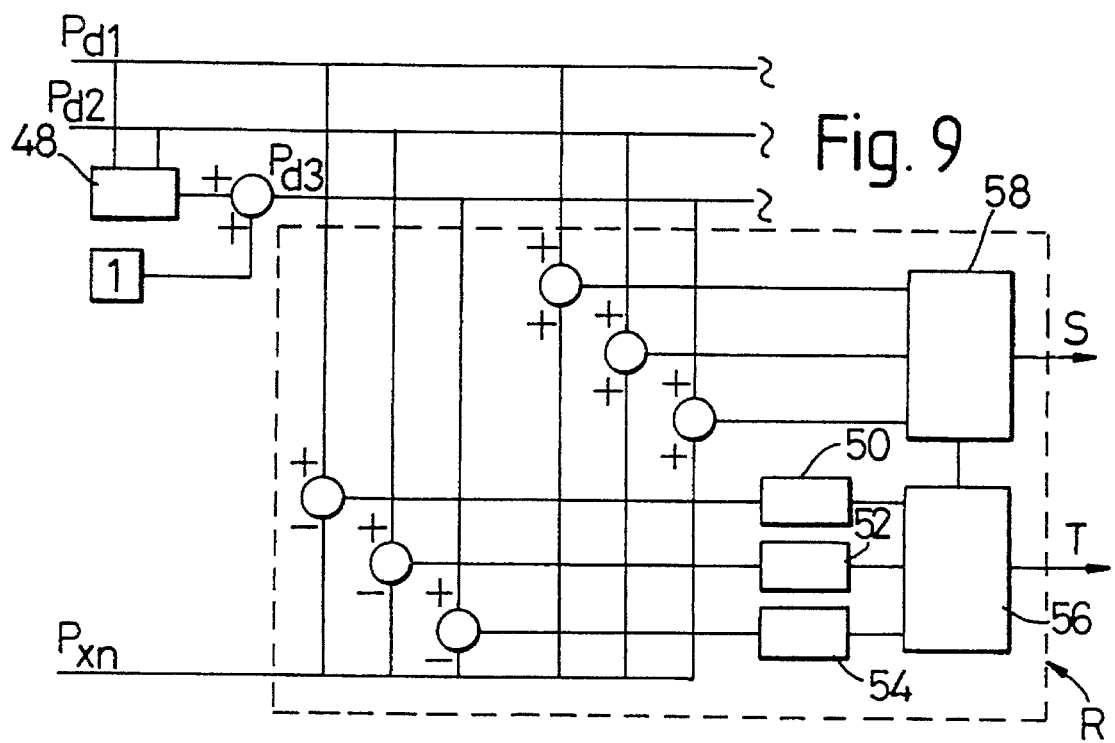
Fig. 8
Fig. 9

FIG. 11

| $P_x$ | NEAREST $P_d$ | MISS DISTANCE | SUM OF ESTIMATES | SMALLEST MISS DISTANCE | CORRESPONDING SUM OF ESTIMATES |
|---|---|---|---|---|---|
| 0.97 | 1.09 | 0.12 | 2.06 | | |
| 0.89 | 0.81 | 0.08 | 1.70 | 0.08 | 1.70 |
| 1.89 | 1.09 | 0.80 | 1.98 | | |

FIG. 13

| CANDIDATE | FRACTIONAL POSITION | CORRESPONDING MOVEMENT | MOVEMENT MAGNITUDE | SELECTED MOVEMENT | NEW COMPLETE POSITION ELEMENT |
|---|---|---|---|---|---|
| $\hat{P}$ | 0.05 | −0.80 | 0.80 | | |
| $\hat{P}_{+1}$ | 1.05 | +0.20 | 0.20 | +0.20 | 4.05 |
| $\hat{P}_{-1}$ | −0.95 | −1.80 | 1.80 | | |

ENHANCED POSITION SIGNALS IN OPTICAL TORQUE SENSORS

This invention relates to improvements in signal processing in optical torque sensors which are especially, but not exclusively, for incorporation in power-assisted steering systems for vehicles.

In our European patent application no. 93300792.4, a torque sensor is described which comprises an input member, an output member, emitter means, first receiver means adapted to receive a first signal, second receiver means adapted to receive a second signal, and signal processing means, in which said signal processing means is adapted to receive output signals from the first and second receiver means, the output signals of the receiver means being dependent upon the first and second signals which they receive, and the signal processing means being adapted to process the output signals from the first and second receiver means so as to produce a modified output signal indicative of the relative angular displacement between, or torque applied between, the input and output member. In a described embodiment of the invention input and output masks are associated with the input and output members respectively, interposed between the emitter means and the first and second receiver means. In this embodiment preferably the first or second receiver means comprise first and second effective receivers respectively and the masks each comprise an equi-angularly spaced set of apertures, the masks having equal aperture pitch and each aperture subtending substantially half an aperture pitch at the central axis of the respective mask, the aperture pitch being defined as the total angle subtended by one opaque and one transparent region of the mask.

The torque sensor may be used in a power-assisted steering system for a vehicle. In such a system the output signals from the first and second receiver means may be processed to determine the rate of rotation of the vehicle steering shaft and a digital position measurement of the angular displacement of the steering shaft. This information can be used in a vehicle control microprocessor to modify or control the suspension and/or braking characteristics of the vehicle.

A disadvantage of the digital position measurement scheme for measuring the angular displacement of the steering shaft, described in our European Patent Application No. 93300792.4, is that the position indication provided is strictly valid only for a point halfway along the torsion bar which connects the input and output members of the described embodiments of the invention, rather than the position of a steering assistance actuator, which may be an electric or hydraulic motor, attached to an output end of the torsion bar. The torsional displacement in the intervening half of the torsion bar introduces a torque-related error in the angular displacement of the steering assistance actuator calculated using the information from the torque sensor. This is particularly disadvantageous when the desired objective is to measure the steering assistance actuator position with a view to damping out unwanted oscillations of the steering assistance system.

A further disadvantage of the signal processing described in the European Application is the limited resolution that it provides. A steering shaft position measurement can only be provided with a resolution limited to one half of the mask aperture pitch since at any one time a selector switch used in the signal processing system selects to monitor only the signal change in the difference between the output signals from either the two receivers of the first receiver means, or the two receivers of the second receiver means. This difference only changes sign once every time the steering shaft rotates by half of one aperture pitch, therefore the minimum shaft rotation which may be detected is limited to a half of one aperture pitch.

Additionally, although the polarity of the torque signal provided by the torque sensor may be used to derive the direction of movement of the steering shaft, this polarity is strictly indicative only of torque direction rather than the steering shaft rotation direction, since torque and velocity are in fact independent variables. This therefore introduces further possible error into any calculated angular position of the steering shaft.

An aim of the present invention is to provide signal processing of the output signals from the first and second receiver means to obtain an analogue signal, or a relatively high resolution digital signal, which represents the steering assistance actuator position on a continuous or near-continuous scale.

According to a first aspect of the invention an angular position sensor for measuring angular position comprises an input member coupled to one end of a torsion bar, an output member coupled to another end of the torsion bar, emitter means, first receiver means adapted to receive a first signal, second receiver means adapted to receive a second signal, and signal processing means in which said signal processing means is adapted to receive output signals from the first and second receiver means, the output signals of the receiver means being dependent upon the first and second signals which they receive, and wherein the signal processing means is further adapted to process the output signals from the first and second receiver means so as to produce a modified output signal which closely matches and is representative of the angular position of a chosen portion of the torsion bar on a substantially continuous scale and relative to an arbitrarily chosen zero position.

Preferably, the output member is associated with a steering assistance actuator and the chosen portion of the trosion bar is that end of the bar which is coupled to the output member, so that the modified output signal represents the angular position of the steering assistance actuator.

Alternatively, the input member is associated with a steering wheel and the chosen portion of the torsion bar is that end of the bar which is coupled to the input member, so that the modified output signal represents the angular position of the steering wheel.

Alternatively, the chosen portion of the torsion bar is a portion of the bar lying between the two ends of the bar.

Preferably the first and second receiver means each comprise first and second effective receivers and the signal processing means is adapted to process the output signals from the first and second receiver means in a series of signal processing steps.

According to a second aspect the invention comprises a method of measuring angular position using an angular position sensor according to the first aspect of the invention, in which the first stage of the signal processing comprises generating at least three signals from different combinations of the output signals from the first and second receiver means. One of the three generated signals may comprise the sum of the signals from the first and second effective receivers of the second receiver means subtracted from the sum of the signals from the first and second effective receivers of the first receiver means. A second of the three generated signals may comprise the sum of the difference between the signals from the first and second effective receivers of the first receiver means and the difference between the signals from the first and second effective receivers of the second receiver means. Preferably then the third of the three generated signals comprises the difference between the signals from the first and second effective receivers of the second receiver means subtracted from the difference between the signals from the first and second effective receivers of the first receiver means.

There may also be generated a fourth signal comprising the sum of all the signals from the first and second receiver means. This signal may be used to normalise the three signals generated from the different combinations of the output signals from the first and second receiver means.

Preferably a second step of the signal processing comprises generating two pairs of signals from the three, preferably normalised, signals generated in the first stage of the processing, these four signals representing four possible estimates of the instantaneous position of the chosen portion of the torsion bar as a fraction of one mask aperture pitch of an input and/or an output aperture-containing mask associated with the input and/or output members respectively.

Preferably one pair of these two pairs of signals is generated using the normalised value of the one of the three signals, generated in the first step of the processing, which comprises the difference between the signals from the first and second effective receivers of the second receiver means subtracted from the difference between the signals from the first and second effective receivers of the first receiver means. Preferably the other pair of signals generated in the second stage of the processing is generated using the normalised values of the remaining two of the three signals generated in the first step of the processing.

Preferably a third step of the signal processing comprises generating synthetically at least two further estimates of the fractional position of the chosen portion of the torsion bar. Each one of the two synthetically generated estimates may be associated with a respective one of the pairs of genuine estimates thus providing two trios of instantaneous fractional position estimates. The closest pair of estimates may be calculated by processing means which selects the least distant of the three estimated values of one trio from a single estimated value of the other trio, and calculates their sum. This process is preferably repeated for each of the remaining two estimated values of the latter trio of estimates. Preferably further processing means is provided to select the sum of the overall closest pair of estimates. This sum may then be halved to provide the best estimate of the fractional position of the chosen portion of the torsion bar.

A final signal processing step may comprise counting the number of complete mask aperture pitches which have been traversed. The signal processing generates at least two synthetic position estimates associated with the best fractional position estimate calculated in stage three of the signal processing, thus providing three position estimates, and calculates the movement in position of the chosen portion of the torsion bar represented by each of these three position estimates in relation to the old fractional position estimate. Processing means are preferably provided which may then select the movement of minimum magnitude out of the three calculated movements and add the corresponding positive or negative minimum movement to the old complete position estimate to provide a measurement of the position of the chosen portion of the torsion bar relative to an arbitrarily chosen zero position.

Preferably the signals from the first and second receiver means are sampled frequently enough that the largest expected inter-sample movement of the chosen portyion of the torsion bar is well under one half of one aperture pitch. This enables the direction of movement of the chosen portion to be determined unambiguously.

The new complete estimate of the position of the chosen portion of the torsion bar, relative to the arbitrary zero position, is the final output of the improved position measurement scheme. This output may be filtered using a conventional digital filter, before use.

According to a third aspect the invention comprises a power-assisted steering system having a sensor according to the first aspect of the invention, an input column transmitting torque from a steering wheel to the input member of the sensor, and an output column transferring torque to a steering mechanism adapted to steer road wheels of the system.

Embodiments of the invention will now be described by way of example only with reference to the accompanying drawings of which:

FIG. 8 is a block diagram of the second stage of signal processing;

FIG. 9 is a block diagram showing a signal processing module which performs nearest distance calculations;

FIG. 11 is a table of values which are calculated during the third stage of signal processing for an example selection of input signals;

FIG. 13 is a table of values which is calculated during the final stage of signal processing for an example old complete position estimate and example new fractional position estimate.

Figure 1:
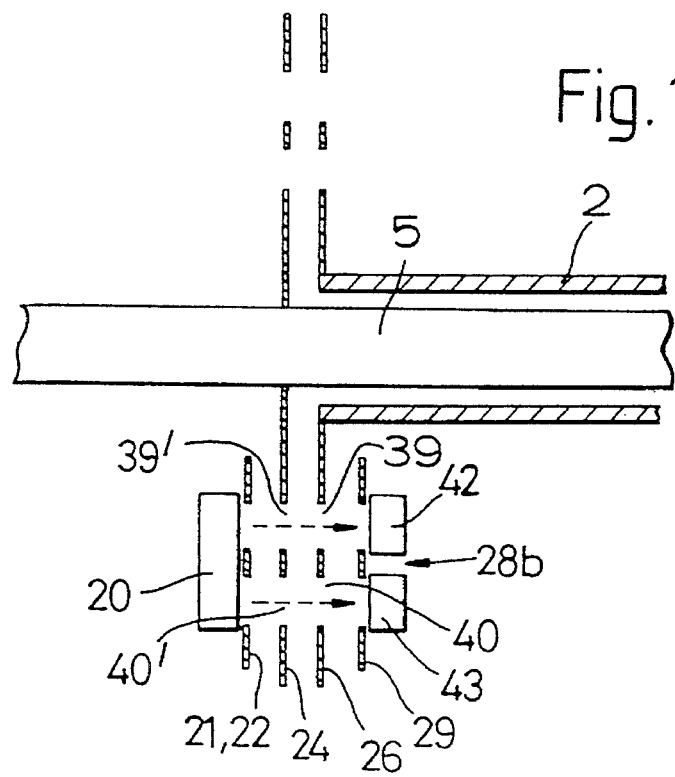
FIG. 1 shows schematically the principle behind an optical torque sensor for incorporation in a power-assisted steering system for a vehicle.
Figure 2:
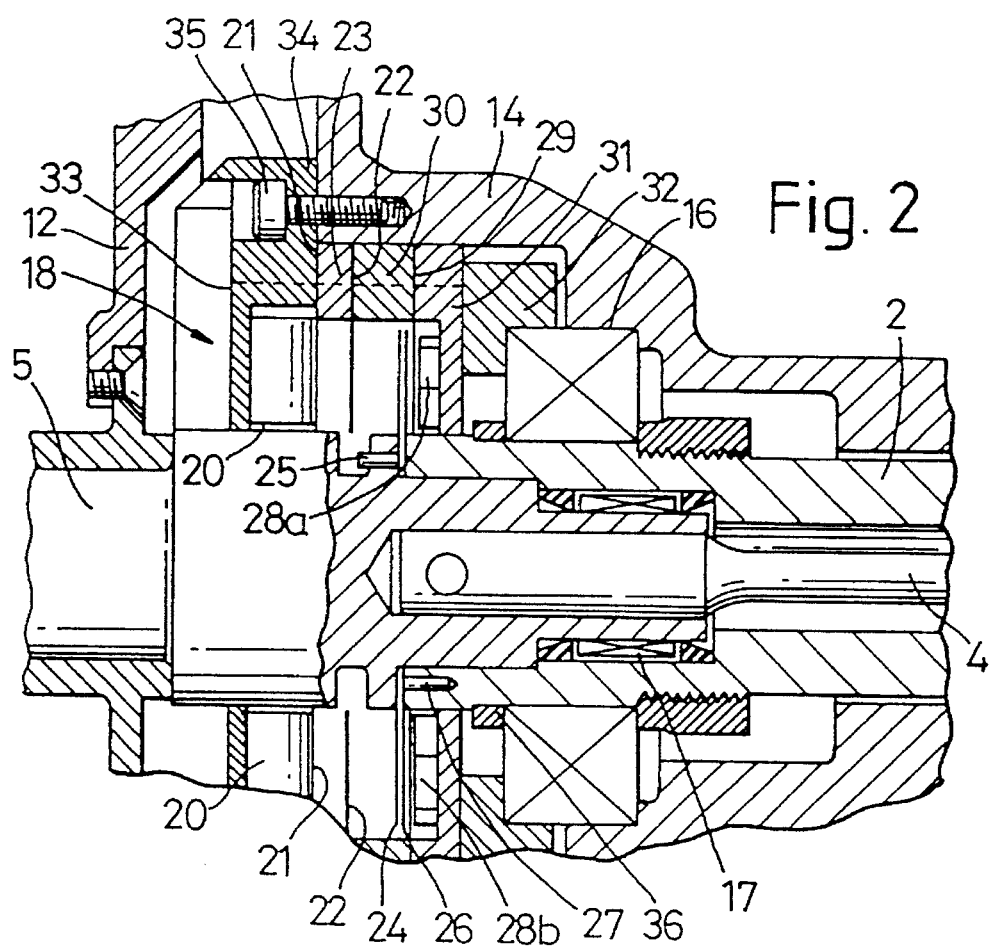
FIG. 2 is a detached schematic view of the optical torque sensor incorporated in a power-assisted steering system for a vehicle.

An optical torque sensor for incorporation in a power-assisted steering system for a vehicle is shown schematically in FIG. 1 and is shown incorporated in a power-assisted steering system for a vehicle in FIG. 2. The power-assisted steering system comprises a steering input shaft 2 coupled at one end to a steering wheel and at the other end to a torsion bar 4 which transmits steering torque to a steering output shaft 5. A steering assistance actuator comprising a motor is attached to the steering output end of the torsion bar 4. Input torque is applied to the input shaft 2 which moves angularly relative to the output shaft 5, due to the torsion bar twisting under the applied torque differential. The optical torque sensor 18 detects the relative angular movement between the input and output shafts and sends a signal indicative of the relative displacement to a control microprocessor. The microprocessor controls the motor so as to apply torque to the steering output shaft 5 in a sense such as to reduce the relative angular displacement between the input and output shafts. In addition the torque sensor can also be used to obtain the rate of rotation of the steering output shaft 5 and the angular displacement of the steering output shaft 5.

As shown schematically in FIG. 1 and FIG. 2, the torque sensor comprises two LED light sources 20 fixed relative to a housing 14; a pair of source collimator plates 21 and 22 associated with the light sources and also fixed relative to the housing 14; an annular spacer 23 provided between the source collimator plates 21 and 22; an output disc or mask 24 rigidly attached to the output shaft 5 by studs 25; an input disc or mask 26 rigidly attached to the input shaft 2 by studs 27, a pair of light detector units 28a and 28b fixed relative to the housing 14; a detector collimator 29 associated with the detectors units 28 and also fixed relative to the housing 14; an annular spacer 30 interposed between the detector collimator 29 and the source collimator 22; a detector-mounting dish member 31 upon which the detector units 28 are mounted; a packing member 32 provided between the mounting member 31 and the adjacent bearing 16; and an LED—mounting dish member 33 upon which the LED sources are mounted, the dish member 33 having lugs 34 by means of which it is clamped via screws 35 to the housing 14. A circlip 36 holds the bearing 16 in place.

Figure 3:
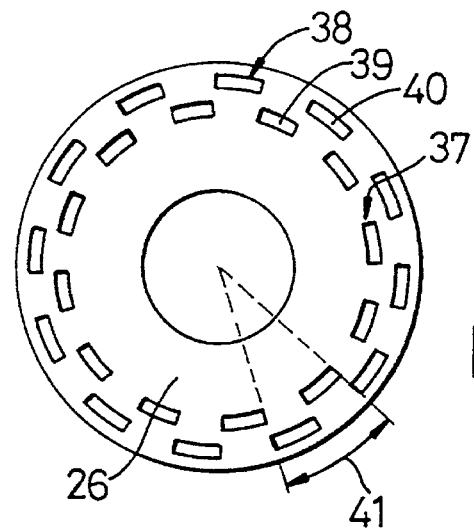
FIGS. 3 and 4 show, respectively, input and output discs which comprise parts of the torque sensor of FIG. 1.

FIG. 3 shows a known arrangement of the input mask 26. The mask 26 is an annular disc having inner and outer rings 37 and 38 of circumferentially elongate apertures 39 and 40. The apertures 39 and 40 are equi-angularly spaced and have an angular pitch referenced 41. Each aperture subtends half a pitch at the central axis of the disc. The two rings 37 and 38 are angularly offset in antiphase with each other so that the apertures 39 of the inner ring are at the same angular positions as the opaque, blocking, regions of the outer ring.

Figure 4:
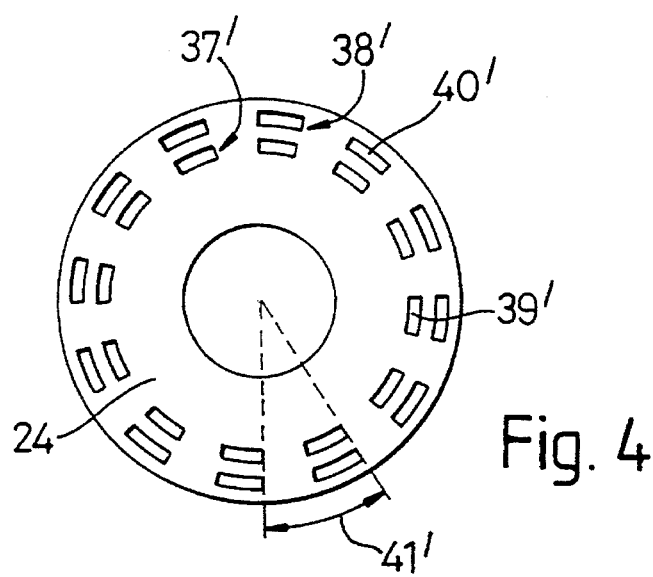

FIG. 4 shows the arrangement of the output mask 24 which is similar to that of the input mask 26 except that the apertures of the inner and outer rings are not offset, they are in phase with each other. The rings 38 and 38', and 39 and 39' are superimposed upon each other, as illustrated schematically in FIG. 1.

Figure 5:
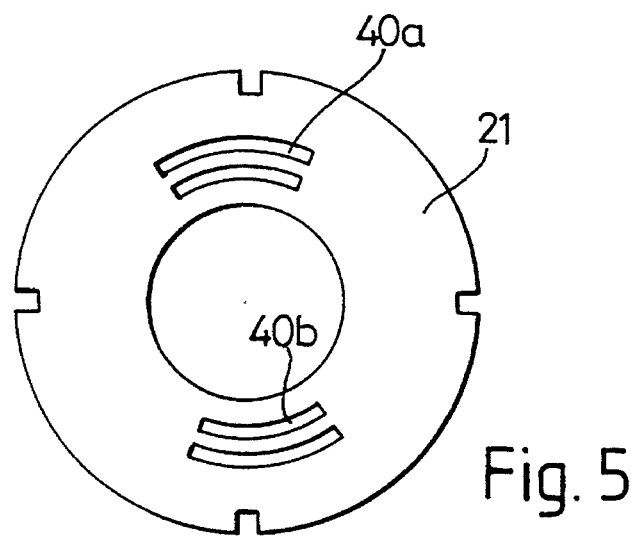
FIG. 5 shows a collimator of the torque sensor of FIG. 1.

FIG. 5 shows the LED light source collimator 21 which comprises a plate having an angularly spaced pair of inner and outer collimating apertures 40a and 40b each pair of which registers with respective ones of the LED's 20. The collimator plate has notches 41 in its outer periphery which assist in locating the collimator relative to the member 33.

Each detector unit 28a and 28b comprises an inner track detector 42 and an outer track detector 43.

The detector collimator 29 is substantially the same as the source collimator 21, and the apertures 40a and 40b of each of the collimating plates are aligned. The collimator apertures 40a and 40b are arranged to have radial dimensions similar to those of the apertures 39, 39', 40, 40' in the rotating masks 24, 26 but the circumferential dimension of the collimator apertures is an integral multiple of the aperture pitch on the rotating masks 24, 26.

To process output signals A1 and A2 from the outer track detectors and B1 and B2 from the inner track detectors it is helpful to consider these signals in the matrix form:

$$\begin{bmatrix} A1 & A2 \\ B1 & B2 \end{bmatrix}$$

This matrix can be algebraically summed in the following different ways according to the signs allocated to the elements:

$$\begin{bmatrix} +A1 & +A2 \\ +B1 & +B2 \end{bmatrix} \begin{bmatrix} +A1 & +A2 \\ -B1 & -B2 \end{bmatrix} \begin{bmatrix} +A1 & -A2 \\ +B1 & -B2 \end{bmatrix} \begin{bmatrix} +A1 & -A2 \\ -B1 & +B2 \end{bmatrix}$$

Figure 6:
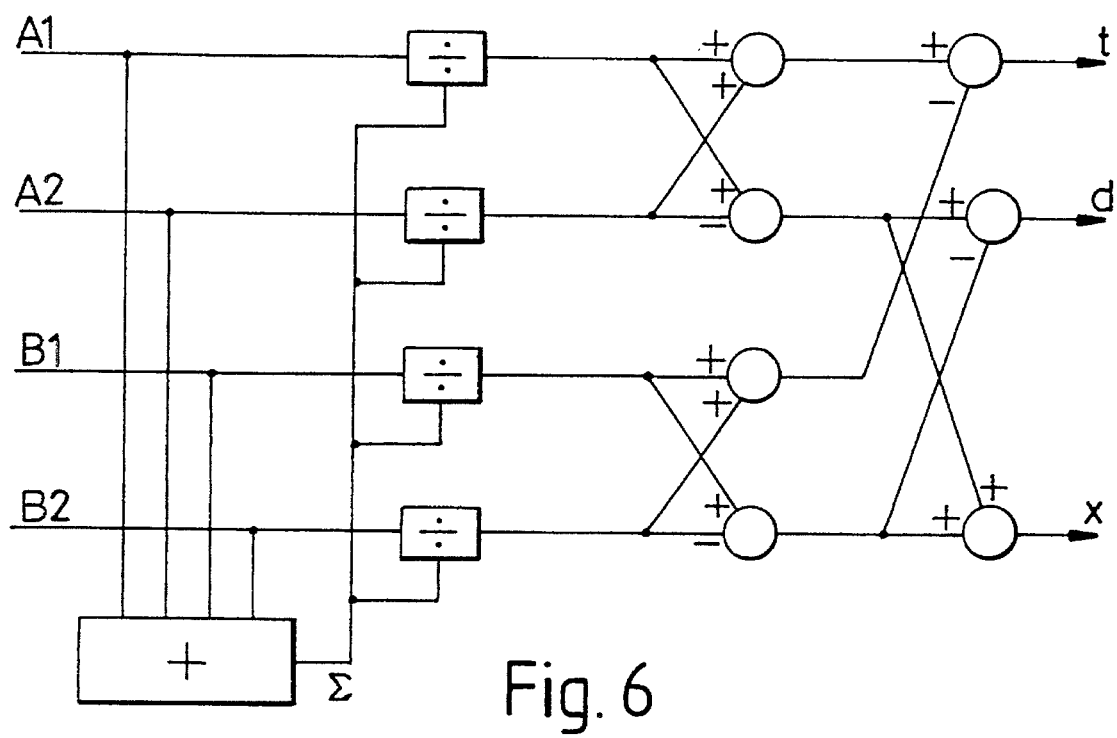
FIG. 6 is a block diagram of the first stage of signal processing in which signals are generated for the detector outputs.

The detector output signals A1, A2, B1 and B2 are fed to a control microprocessor. The first stage of the signal processing comprises generating signals which correspond to the quantities represented by these four matrices. A block diagram showing how these signals can be generated electrically by the control microprocessor is shown in FIG. 6. The signals A1, A2, B1 and B2 are first summed by an adding circuit to produce a total signal which is represented by the matrix:

$$\Sigma = \begin{bmatrix} +A1 & +A2 \\ +B1 & +B2 \end{bmatrix}$$

Four dividers are then used to normalise all four of the signals A1, A2, B1 and B2 to produce the signals A1/$\Sigma$, A2/$\Sigma$, B1/$\Sigma$ and B2/$\Sigma$. Four adding circuits are then used to produce respectively the following four signals:

$$\frac{A1+A2}{\Sigma} \quad \frac{A1-A2}{\Sigma} \quad \frac{B1+B2}{\Sigma} \quad \frac{B1-B2}{\Sigma}$$

Three further adding circuits are then used to produce three signals t, x and d given by:

$$t=(A1+A2-B1-B2)/\Sigma \quad x=(A1-A2+B1-B2)/\Sigma \quad d=(A1-A2-B1+B2)/\Sigma$$

where it will be noticed that the products $\Sigma t$, $\Sigma x$ and $\Sigma d$ can be represented by the following matrices:

$$\Sigma t = \begin{bmatrix} +A1 & +A2 \\ -B1 & -B2 \end{bmatrix}$$

$$\Sigma x = \begin{bmatrix} +A1 & -A2 \\ +B1 & -B2 \end{bmatrix}$$

$$\Sigma d = \begin{bmatrix} +A1 & -A2 \\ -B1 & +B2 \end{bmatrix}$$

Thus the signals t, x and d represent the above three matrices, normalised with respect to the value of $\Sigma$, which remains constant (regardless of applied torque) if the sensor is operating correctly. The signal, t, is a differential position signal which relates to the torque. It is in fact the value of the applied torque, normalised with respect to the theoretical maximum torque corresponding to ¼ of the mask aperture pitch.

Figure 7:
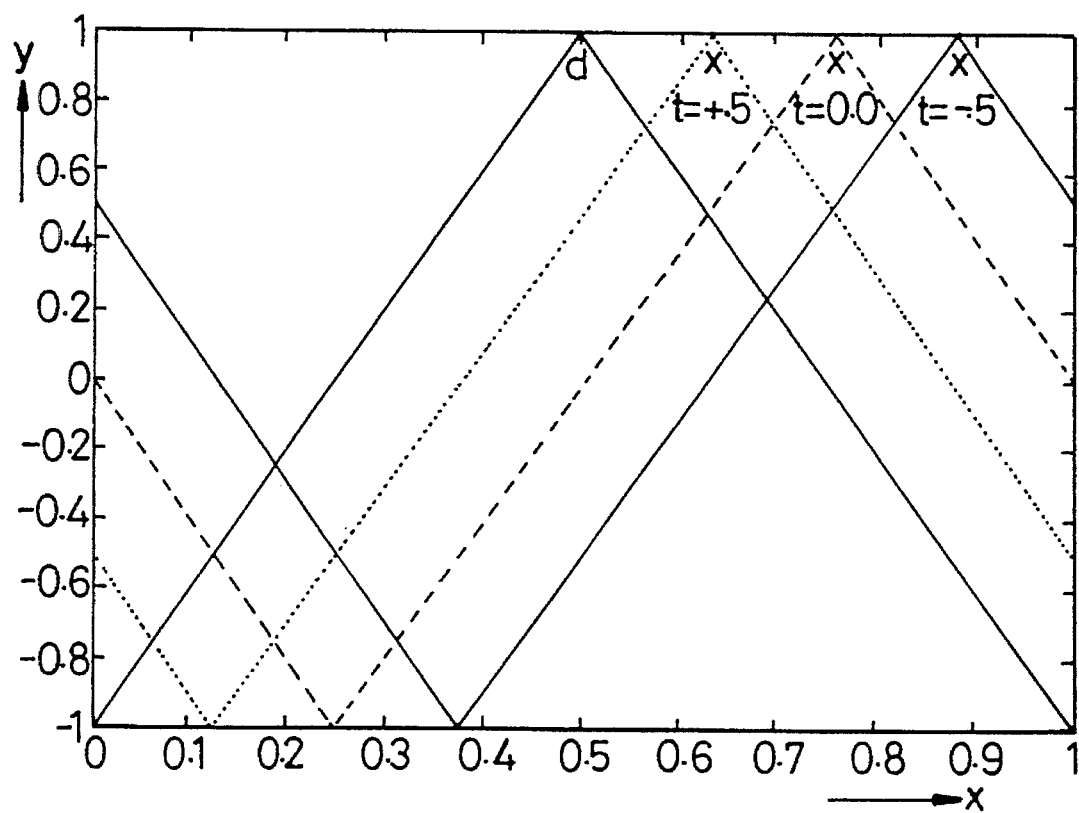
FIG. 7 is a graph showing the waveforms of the signals x and d plotted against the steering assistance actuator position.

The signals x and d each yield a single triangular waveform of unit amplitude as the steering position alters within a given mask aperture pitch, as shown graphically in FIG. 7 in which normalised amplitude (Y-axis) us plotted against (Actuator position)/(aperture pitch) (X-axis). The signal d relates to the position of the steering actuator end of the torsion bar, normalised with respect to $\Sigma$, without any sensitivity to torque. Similarly, the signal x is representative of the normalised position, of the steering wheel end of the torsion bar, without any torque sensitivity. It can be shown that the relative phase of d and x therefore alters as shown in FIG. 7 when the torsion bar twists under applied torque.

As can be seen from the graph of FIG. 7 any one value of d yields two possible values, Pd12, of the steering actuator end position, and by rearranging the equation which defines the triangular waveform of signal d we obtain:

$$Pd12 = \text{fractional part of} \left( \frac{2 \pm (1-d)}{4} \right)$$

However, only one of these values is correct. Similarly, at any given level of t, any one value of x also yields two possible values, Px12, of the steering actuator end position:

$$Pd12 = \text{fractional part of} \left( \frac{3 - t \pm (1-x)}{4} \right)$$

The block diagram shown in FIG. 8 shows how the Px and Pd estimates can be generated by the microprocessor. An adding circuit produces a (1−d) signal. Two further adding circuits then produce a [2+(1−d)] signal and a [2−(1−d)] signal, respectively. Each of these signals is input to a respective divider, the two dividers producing two signals which represent the values of Pd1 and Pd2. In a similar manner, two adding circuits are used to produce a (1−x) signal and a (3−t) signal. Two further adding circuits produce a [3−t+(1−x)] signal and a [3−t−(1−x)] signal. Finally, two dividers operate respectively on these two signals to produce two signals which represent the values of Px1 and Px2. Only one of the two values of Pd obtained from d will agree closely with one of the two values of Px derived from x, thus resolving the ambiguity over which is the correct estimate. The best estimate, of the steering actuator end position, P, will be the average of the agreeing Pd,Px pair. Closely, in this context must be defined so as to favour, for example, a pair of Pd,Px estimates (0.09, 0.97) distant 0.12 from each other over another example pair (0.81, 0.97) distant 0.16 from each other.

The least distant of three Pd estimates from a single Px estimate can be selected using a signal processing method incorporating the use of a processing module. The three Pd estimates are the two that have been generated (0.09, 0.81 in the example), plus a synthetic one generated specifically to resolve this problem. The synthetically generated Pd estimate is unity plus the lower of the two original, generated estimates. In the example the three estimates of Pd would be 0.09, 0.81 (both genuine) and 1.09 (synthetic). A simple nearest distance calculation can now recognise the closeness to the 0.97 Pd estimate of the 1.09 Px synthetic estimate. The block diagram in FIG. 9 shows a processing system which can be used to generate the synthetic Pd estimate, in combination with a module, R, used to perform the nearest distance calculation.

A MIN block, 48, shown in FIG. 9 selects the lower of the Pd1 and Pd2 estimates and the selected value is summed with unity using an adding circuit. The output of the adding circuit is the signal representing the synthetic estimate, Pd3. The remaining processing circuitry shown in FIG. 9 comprises the nearest distance module, R. Three adding circuits are provided to produce signals representing the values of (Pd1−Pxn), (Pd2−Pxn) and (Pd3−Pxn) where Pxn represents one Px estimate. Each of these three signals is then fed to a respective one of three ABS blocks 50, 52, 54. Each ABS block outputs the magnitude of its input, thus the three ABS blocks produce signals representing the magnitude of the signals (Pd1−Pxn), (Pd2−Pxn) and (Pd3−Pxn). These magnitudes will be referred to as the candidate miss distances. The three candidate miss distances are input to a Select Min block 56 which outputs the lowest of the three, which is the smallest miss distance, T.

A further three adding circuits are also provided in the module, which sum each of the Pd estimates with the Pxn estimate to produce the signals (Pd1+Pxn), (Pd2+Pxn) and (Pd3+Pxn). These three signals are then input to a Slave Select block 58. The Slave Select block is slaved from the Select Min block 56 and outputs the one of its input sums which corresponds to the output of the Select Min block. This output, S, therefore represents the sum of the Pxn estimate and the Pd estimate closest to Pxn.

The nearest distance module, R, therefore comprises the six adding circuits which produce the signals dependant on the Pxn estimate, the three ABS blocks, the Select Min block and the Slave Select block.

Figure 10:
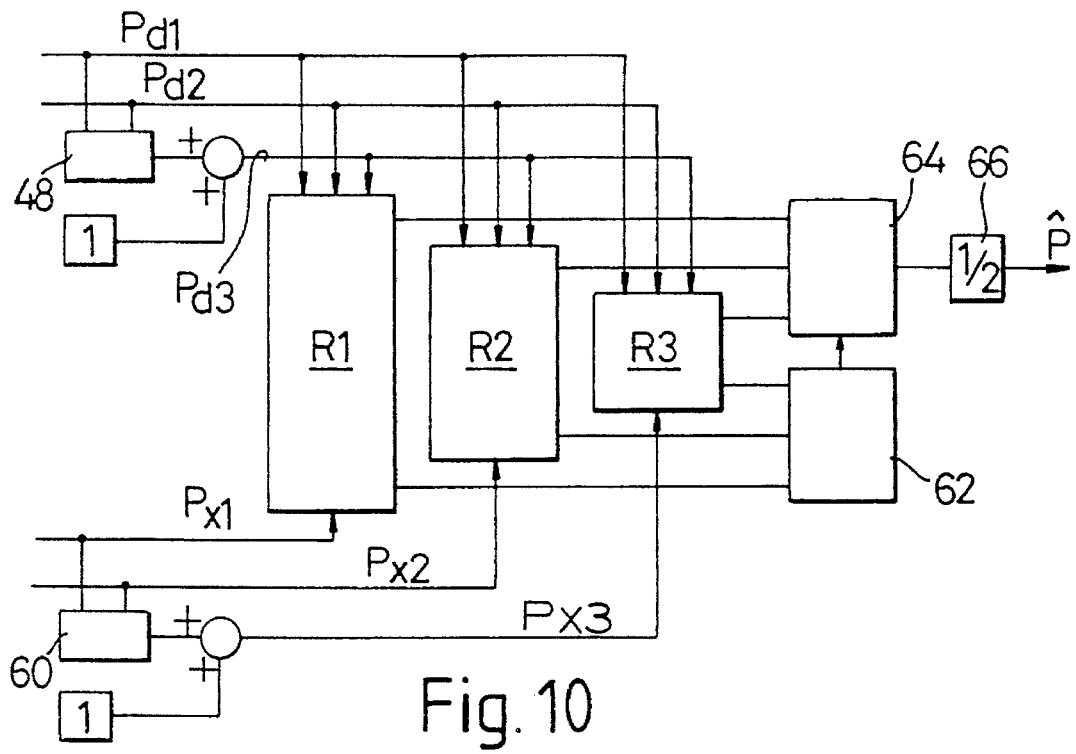
FIG. 10 is a block diagram of the third stage of signal processing, incorporating three nearest distance modules.

Three such nearest distance modules can be used to identify the closest Pd estimate for each of three Px estimates, the three Px estimates comprising the two original Px estimates, Px1 and Px2, and one synthetically generated estimate, Px3. FIG. 10 shows a block diagram representing the kind of signal processing system which can be used to perform this function. The synthetic Px estimate, Px3, is generated similarly to the Pd3 estimate, using a MIN block 60 and an adding circuit. Signal Px1 is input to the first module R1 of three nearest distance modules R1, R2, R3, Px2 is input to the second module R2, and Px3 is input to the third module, R3. Signals Pd1, Pd2 and Pd3 are all input to each of the three modules. The three smallest miss distance signals output from the three modules are input to a Select Min block 62. The three further outputs from the three modules, representing the sums of the position estimate pairs corresponding to the smallest miss distance signals, are input to a Slave Select block 64 which is slaved to the Select Min block 62. The Select Min block identifies the minimum of the three smallest miss distances and the Slave Select block then outputs the sum of the corresponding overall closest pair of Pd and Px estimates. A divider 66 then halves the output to provide a best estimate, $\hat{P}$, of the steering actuator end position as a fraction of one aperture pitch.

The table shown in FIG. 11 shows the values which would be calculated in the processing system illustrated by the block diagram of FIG. 10 in the example where the values of Px123 and Pd123 are:

Pd123=(0.09, 0.81, 1.09) Px123=(0.97, 0.89, 1.89)

The final calculated value of P in this example is 0.85 of one aperture pitch.

In order to resolve the ambiguity as to which aperture pitches have been traversed it is further necessary to introduce a scheme for counting them. If samples of the analogue position signals were simply to be taken infrequently it would be possible to miss counting a transition between complete aperture pitches. Therefore it is necessary to sample the analogue position signals frequently enough to avoid losing a transition at the fastest rate of movement expected.

It will be appreciated that, conversely to the situation illustrated in FIG. 7 where the relative phase between x and d is illustrated for varijous values of x at various values of t if d is constant, there are various values of d at the various values of t if x is constant. Consequently, it will be appreciated that, similarly to the calculation of the best estimate of the steering actuator end position as a fraction of one aperture pitch, it would alternatively be possible to calculate a value representing the best estimate of the steering wheel end position as a fraction of one aperture pitch.

The final stage of signal processing comprises a method for keeping count of the complete mask aperture pitches which have been traversed.

Unless samples of the analogue position signal are taken sufficiently frequently it is not possible to recognise unambiguously the direction of movement. Continuing with the example, where an estimate $\hat{P}$ of 0.85 has been obtained, if the next estimate of the fractional position were to be 0.05, it could be inferred that the movement was almost certainly not decreasing by 0.80 to 0.05, but increasing by 0.20, beyond unity to 0.05 in the next aperture pitch, and that the count of whole aperture pitches should therefore be incremented by one. If instead, the next sample were to be 0.60 it could be inferred that there had been a movement of 0.25 in the decreasing direction, but this would not require a change in the count of whole aperture pitches.

If however the next sample were to be 0.35, then it would not be clear which direction of movement had occurred. Therefore it is necessary to take samples of the analogue position signals frequently enough to avoid this ambiguity at the fastest rate of movement expected. The detector output signals should therefore be sampled frequently enough that the largest expected inter-sample movement is well under one half of an aperture pitch.

Sampling frequently in this manner enables the direction of movement of the steering actuator to be determined at every iteration of the position calculation by comparing the derived fractional position estimate, $\hat{P}$, and the synthetically generated estimates corresponding to the quantities ($\hat{P}$+1) and ($\hat{P}$−1), with the old fractional position estimate derived from the previous iteration.

Figure 12:
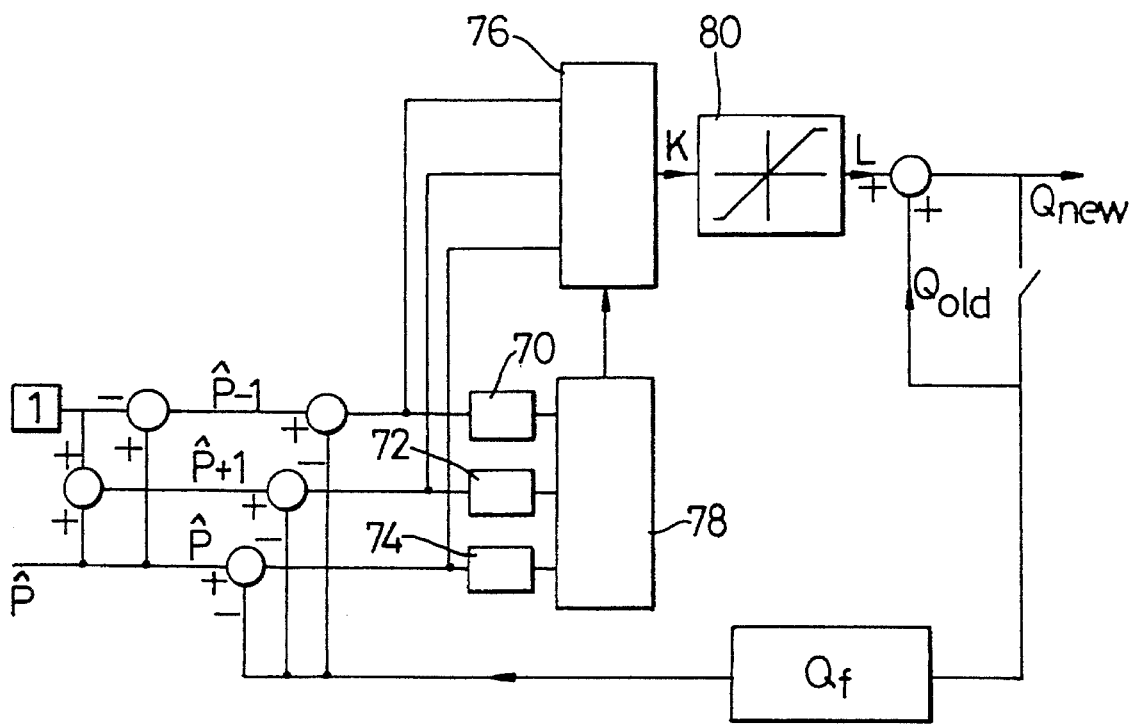
FIG. 12 is a block diagram of the final stage of signal processing in which a new complete position estimate of the steering wheel is calculated.

The block diagram in FIG. 12 shows an example of a signal processing system which can be used to determine the direction of movement, and ultimately the new complete position estimate, Q new, of the steering actuator relative to an arbitrarily chosen zero position. Two adding circuits produce the two signals ($\hat{P}$+1) and ($\hat{P}$−1) from the $\hat{P}$ signal, which with the $\hat{P}$ signal, provide three new candidate fractional positions. The signal Qf representing the fractional part of the old complete position estimate, Q old, is subtracted from each of these three candidate positions by a further three adding circuits to produce three candidate position movements corresponding to the three new candidate fractional positions. The three output signals from these three adding circuits are input to three respective ABS blocks 70, 72, 74 and also to a Slave Select block 76. Each ABS block outputs the magnitude of its input and the three ABS block outputs are then input to a Select Min block 78 which selects the minimum of the candidate position movement magnitudes. This selected minimum magnitude is then input to the Slave Select block which outputs the signed candidate position movement corresponding to the selected minimum candidate position movement magnitude. This output of the Slave Select block therefore indicates the least possible movement of the steering actuator, and the direction of this movement.

The output signal K of the Slave Select can then be input to a limiter 80 which limits the signal to correspond to the maximum possible slew rate of the steering actuator in order to alleviate errors due to noise. The output from the limiter is then summed with the old complete (i.e. fractional+ integar pitch) position estimate, Q old, in an adding circuit, to produce the new complete position estimate, Q new, of the position of the steering actuator. The complete position output can thus track changes up and down in the integer and fractional position, while relying on frequent position fixes that give only the current fractional pitch.

The position of the steering actuator is always given relative to the zero of the original arbitrarily chosen pitch, since on the very first sample the old estimate of position is set to zero by reset means (not shown in FIG. 12).

The table shown in FIG. 13 shows various values which would be calculated in the processing system of FIG. 12 where the old complete position estimate, Q old, was 3.85 aperture pitches and the new fractional estimate, $\hat{P}$, is equal to 0.05 of an aperture pitch. In this example the new complete position estimate, Q new, is 4.05 aperture pitch.

The new complete estimate is the final output of the enhanced position measurement scheme. Depending on the dynamics of the control system wherein it is employed, it may be advantageous to filter the output using a conventional digital filter, or otherwise, before use.

We claim:
1. An angular position sensor comprising an input member, a torsion bar with a first end, a second end, and means for predetermining a chosen portion of said torsion bar, said chosen portion being a portion of one of said first and second ends of said torsion bar, said chosen portion for determining an angular position, of said torsion bar, said input member connected to said first end of said torsion bar and an output member coupled to said second end of said torsion bar, emitter means, said emitter means for generating a first signal and a second signal, first receiver means for receiving said first signal, second receiver means for receiving said second signal, said first and second receiver means generating a first and second output signal respectively, said output signals being dependent upon the first and second signals received by said receiver means, and signal processing means for receiving said output signals, said signal processing means processing said output signals so as to produce a modified output signal, said modified output signal being representative of the angular position of said predetermined chosen portion of said torsion bar, a first aperture containing mask rotatable with said input member, a second aperture containing mask rotatable with said output member, means for mounting said mask adjacent to each other for relative angular movement through a range of angular. positions including an arbitrarily chosen zero position, measuring means for measuring said angular position on a substantially continuous scale, with a resolution of less than one mask aperture pitch of said mask associated with one of said input and output members, and relative to said chosen zero position.

2. An angular position sensor according to claim 1 in which said output member is associated with a steering assistance actuator and said chosen portion of said torsion bar is said second end, of said torsion bar, coupled to said output member.

3. An angular position sensor according to claim 2, in which said input member is associated with a steering wheel and said chosen portion of said torsion bar is said first end of said torsion bar, which is coupled to said input member.

4. An angular position sensor according to claim 1, wherein said signal processing means comprises adding, subtracting and dividing means, said adding, subtracting and dividing means co-operating one with another to generate at least a first, a second and a third signal from different combinations of said output signals from said first and second receiver means.

5. An angular position sensor according to claim 4 in which said output signals from said first and second receiver means comprise output signals from a first and a second effective receiver of said first receiver means and output signals from a first and a second effective receiver of said second receiver means and wherein said signal processing means is for processing said output signals from said effective receivers of said first and second receiver means in a series of signal processing steps.

6. An angular position sensor according to claim 5 wherein said adding and said subtracting means of said signal processing means are operative to generate a first of said generated signals, said first generated signal comprising the sum of said output signals from said first and second effective receivers of said second receiver means subtracted from the sum of said output signals from said first and second effective receivers of said first receiver means.

7. An angular position sensor according to claim 5 wherein said adding and said subtracting means of said signal processing means are operative to generate a second of said generated signals, said second generated signal comprising the sum of the difference between the output signals from said first and second effective receivers of first receiver means and the difference between said output signals from said first and second effective receivers of said second receiver means.

8. An angular position sensor according to claim 5 wherein said adding and said subtracting means of said signal processing means are operative to generate a third one of said generated signals, said third generated signal comprising the difference between said output signals from said first and second effective receivers of said second receiver means subtracted from the difference between said output signals from said first and second effective receivers of said first receiver means.

9. An angular position sensor according to claim 5 wherein a further adding means of said signal processing means is operative to generate a further of said generated signals, said further generated signal comprising the sum of all of said output signals from said first and second effective receivers of said first and second receiver means.

10. An angular position sensor according to claim 5 wherein a first of said steps of said signal processing comprises using said dividing means of said signal processing means to normalize said first, second and third generated signals with a further generated signal, said normalization comprising dividing said first, second and third generated signals by said further generated signal.

11. An angular position sensor according to claim 5 wherein a first of said steps of said signal processing comprises using a further generated signal to normalize said output signals from said first and second effective receivers of each of said first and second receiver means prior to generation of said first, second and third generated signals such that said first, second and third generated signals are normalized with respect to said further generated signal, said normalization comprising using said dividing means of said signal processing means to divide said output signals of said first and second effective receivers of each of said first and second receiver means by said further generated signal.

12. An angular position sensor according to claim 10 wherein said signal processing steps further comprise a second step, said second signal processing step comprising generating two pairs of signals from said first signal processing step of said signal processing, using further adding, subtracting and dividing means of said signal processing means to generate said two pairs of signals, said two pairs of generated signals representing four estimates of instantaneous position of said chosen portion of said torsion bar as a fraction of one mask aperture pitch of an input or an output aperture containing mask associated respectively with said input or said output member.

13. An angular position sensor according to claim 12 wherein a first pair of said two pairs of signals is generated by said adding, subtracting and dividing means from said normalized third signal generated in said first step of said signal processing and a second pair of said two pairs of signals is generated by said adding, subtracting and dividing means from said normalized first and second signals generated in said first step of said signal processing.

14. An angular position sensor according to claim 12 wherein said signal processing steps comprise a third step, said third step comprising using a minimum selecting means and a further adding means to generate synthetically at least two further signals representing estimates of an instantaneous position of said chosen portion of said torsion bar as a fraction of said mask aperture pitch and processing said synthetically generated signals, together with said two pairs of signals generated in said second step of said signal processing, using a further minimum value selecting means, further adding means and a module comprising further adding means, absolute value generating means, minimum value selecting means and further adding means to produce a signal representing a best estimate of the instantaneous position of said chosen portion of said torsion bar as a fraction of said mask aperture pitch.

15. An angular position sensor according to claim 14 wherein at least one of said modules, further minimum selecting means, and further adding means are used to associate each one of said two synthetically generated signals with a respective one of said two pairs of generated signals, thus providing a first and a second trio of instantaneous fractional position estimates, and said third step of said signal processing further comprises using said further minimum selecting means to match each estimate of said first trio with one estimate of said second trio which is closest in magnitude to that estimate of said first trio, and summing said two matched estimates, using said further adding means.

16. An angular position sensor according to claim 15 wherein said third step of said signal processing further comprises using further dividing and further minimum selecting means to select said sum of the overall closest pair of said matched estimates and halving this sum using said further dividing means, to produce said signal representing the best estimate of the instantaneous fractional position of said chosen portion of said torsion bar.

17. An angular position sensor according to claim 14 wherein a fourth step of said signal processing comprises using further adding and subtracting means, further absolute value producing means and further minimum selecting means to process said signal representing the best estimate of the instantaneous position to calculate a magnitude of angular movement of said chosen portion of said torsion bar relative to a previous measurement of fractional position of said chosen portion, and using said further adding means to add this magnitude to a previous measurement of angular position of said chosen portion to produce a final output signal representing a new measurement of angular position of said chosen portion, said output signal being said modified output signal of claim 1.

18. An angular position sensor according to claim 14 wherein a fourth step of said signal processing comprises using further adding means to process said signal representing the best estimate in order to produce two new signals, which together with said best estimate signal represent three candidate fractional positions of said chosen portion of said torsion bar.

19. An angular position sensor according to claim 18 wherein said fourth step of said signal processing further comprises using further subtracting means to subtract previous measurement, representing the fractional part of said previous measurement of angular position of said chosen portion of said torsion bar from each of said three candidate fractional positions to produce three signals representing three candidate position movements which are then processed, using further absolute value generating means and further minimum value selecting means to determine the magnitude of the signal representing the minimum of said three candidate position movements relative to said previous measurement representing the fractional part of said previous measurement of angular position.

20. An angular position sensor according to claim 11 further comprising using digital filtering means to filter said modified output signal.

21. A power assisted steering system having an angular position sensor according to claim 1, an input column transmitting torque from a steering wheel to said input member of said sensor, and an output column transferring torque to a steering mechanism for steering road wheels of said system.

* * * * *